United States Patent [19]

Freda et al.

[11] Patent Number: 4,800,094

[45] Date of Patent: Jan. 24, 1989

[54] METHOD FOR PROCESSING A COOKED FOOD PRODUCT

[75] Inventors: Gerald Freda, Palatine; Joseph Bogacz, Chicago; Joseph Freda, Barrington Hills; Dennis Olson, Elgin, all of Ill.

[73] Assignee: C & F Packing, Inc., Chicago, Ill.

[21] Appl. No.: 906,966

[22] Filed: Sep. 15, 1986

Related U.S. Application Data

[62] Division of Ser. No. 763,034, Aug. 6, 1985, Pat. No. 4,731,006.

[51] Int. Cl.⁴ .......................... A22C 7/00; A23P 1/12

[52] U.S. Cl. .................................. 426/513; 426/516; 426/518

[58] Field of Search ............... 426/140, 512, 513, 515, 426/516–518, 448, 454, 646, 802; 17/32; 83/425.1

[56] References Cited

U.S. PATENT DOCUMENTS

| | | | |
|---|---|---|---|
| 497,319 | 5/1893 | Grant | 83/425.1 |
| 664,021 | 12/1900 | Kopp | 83/425.1 |
| 705,543 | 7/1902 | Phillips | 83/425.1 |
| 949,929 | 2/1910 | Hart | 83/425.1 |
| 1,426,016 | 8/1922 | Smith | 83/425.1 |
| 1,449,040 | 3/1923 | Häny | 83/425.1 |
| 2,043,132 | 6/1936 | Vogt | 426/513 |
| 2,101,755 | 12/1937 | Rosenstone et al. | 17/32 |
| 2,670,296 | 2/1954 | Tansley | 426/513 |
| 3,090,075 | 5/1963 | Provenzano et al. | 264/147 |
| 3,311,068 | 3/1967 | Atwood et al. | 17/32 |
| 3,312,997 | 4/1967 | Merrels | 17/32 |
| 3,333,512 | 8/1967 | Parsons | 92/187 |
| 3,344,752 | 10/1967 | Ilines | 425/308 |
| 3,398,702 | 8/1968 | Behr | 17/32 |
| 3,457,085 | 7/1969 | Greenspan | 426/513 |
| 3,511,669 | 5/1970 | Swartz et al. | 426/516 |
| 3,622,353 | 11/1971 | Bradshaw et al. | 426/516 |
| 3,650,765 | 3/1972 | Smadar et al. | 426/516 |
| 3,761,284 | 9/1973 | Foster, Jr. et al. | 426/518 |
| 3,764,345 | 10/1973 | Beck et al. | 426/518 |
| 3,852,487 | 12/1974 | Van Werven et al. | 426/388 |
| 3,870,805 | 3/1975 | Hayes et al. | 426/518 |
| 3,890,453 | 6/1975 | Harmon et al. | 426/518 |
| 4,081,564 | 3/1978 | Borsuk | 426/513 |
| 4,124,339 | 11/1978 | Bernard | 426/516 |
| 4,145,453 | 3/1979 | Lenhardt, Sr. | 426/518 |
| 4,258,066 | 3/1981 | Bernard | 426/516 |
| 4,260,640 | 4/1981 | Hartmann et al. | 426/516 |
| 4,280,385 | 7/1981 | Kienzl | 83/437 |
| 4,369,195 | 1/1983 | Nelson et al. | 426/516 |
| 4,422,372 | 12/1983 | Hoezee | 426/516 |
| 4,473,522 | 9/1984 | Marchesani | 264/145 |
| 4,498,380 | 2/1985 | Maus | 83/44 |
| 4,498,855 | 2/1985 | Baader | 264/141 |
| 4,612,682 | 9/1986 | Holz | 17/26 |
| 4,612,683 | 9/1986 | Holz | 17/26 |

*Primary Examiner*—George Yeung

*Attorney, Agent, or Firm*—Niro, Scavone, Haller, Niro & Rockey, Ltd.

[57] ABSTRACT

An apparatus and method for processing a cooked food product and producing a plurality of cooked food product portions is disclosed. The method includes the steps of positioning the cooked food product in an extrusion location, extruding the cooked food product through an extrusion plate and dividing the extruded cooked food products into a desired thickness and/or weight. The disclosed apparatus includes a positioning element which positions the cooked food product into an extrusion location, as well as an extrusion assembly which extrudes the cooked food product prior to presenting the extruded food product to the dividing apparatus for division into a plurality of portions having a desired thickness and/or weight. Apparatus is also disclosed for selectively varying the shape of the food product portions, as well as apparatus which provides for selective adjustment of the operational parameters of the apparatus to vary the thickness of the cooked food product portions.

25 Claims, 3 Drawing Sheets

FIG. 5
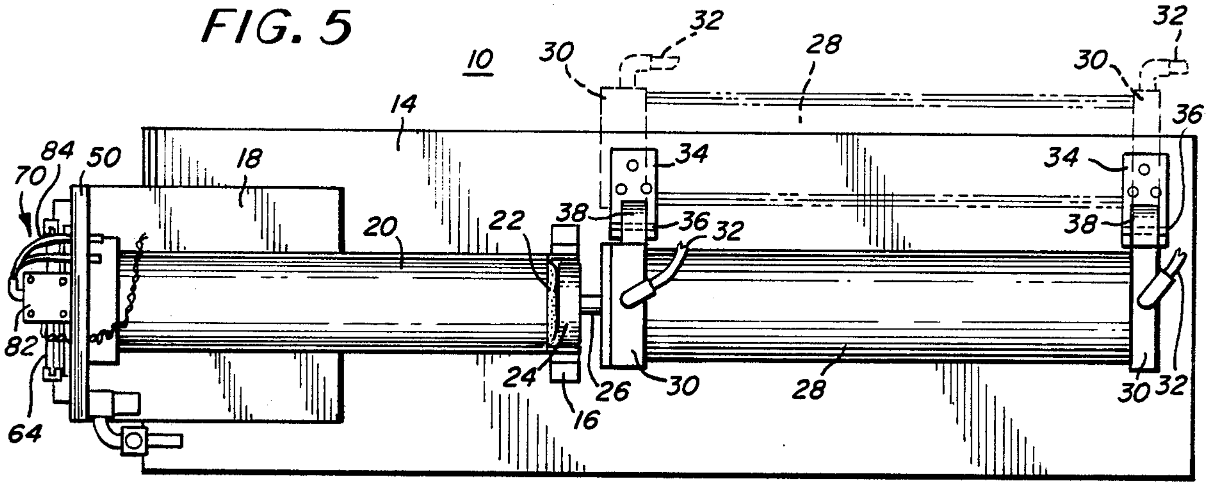
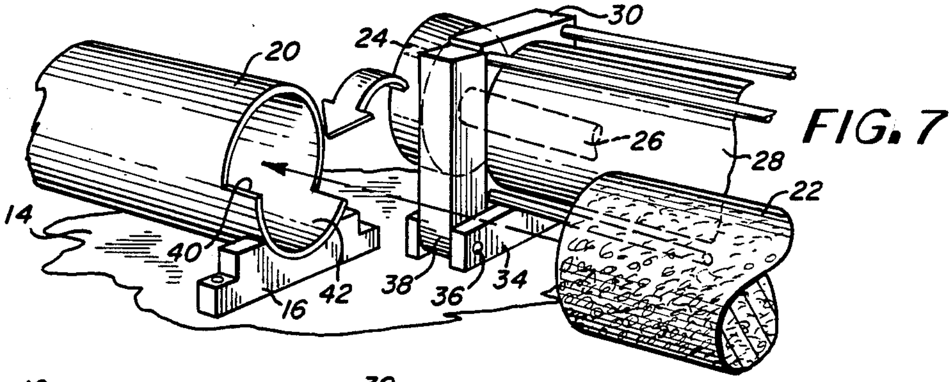
FIG. 7
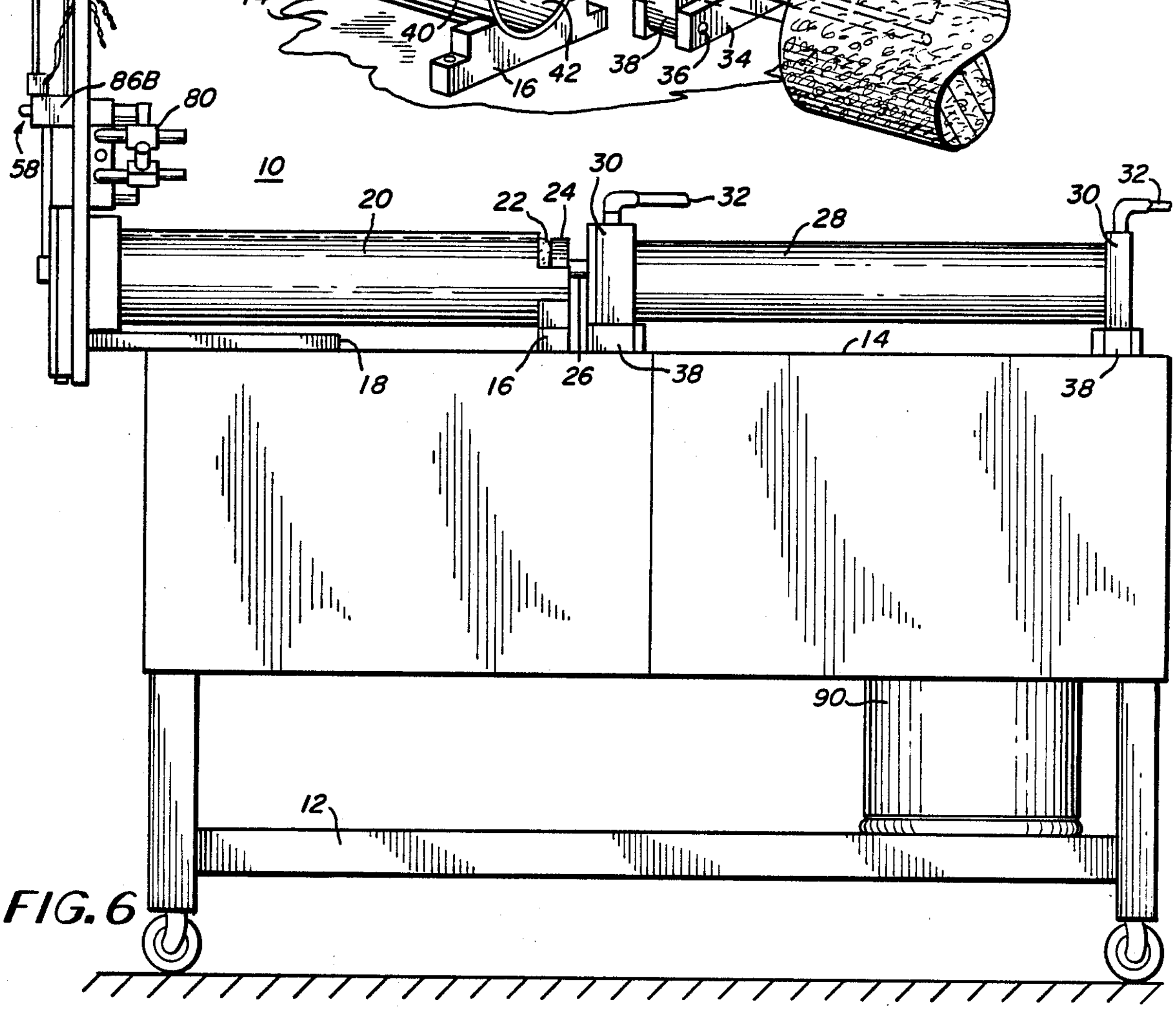
FIG. 6

FIG. 8
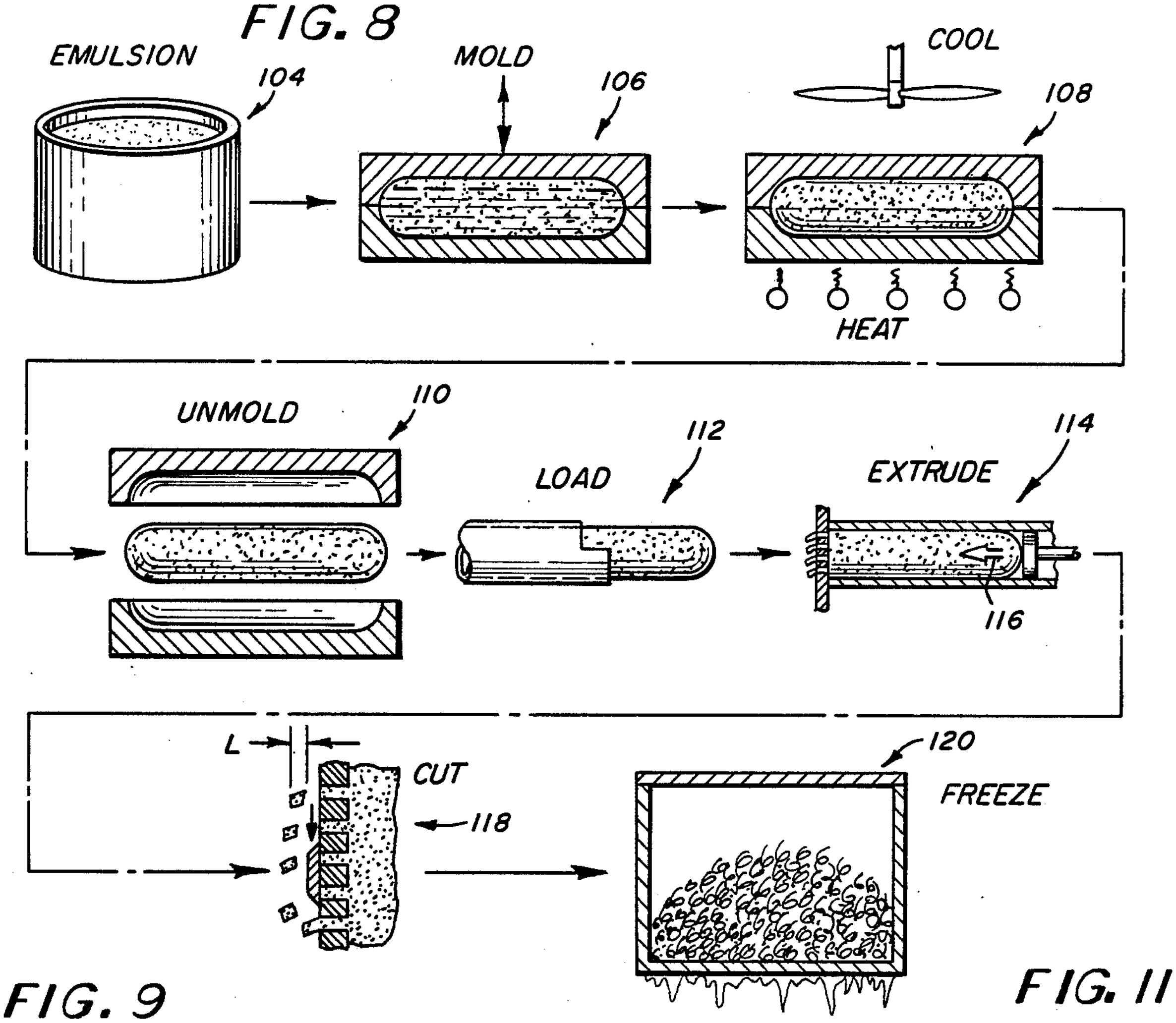
FIG. 9
FIG. 11
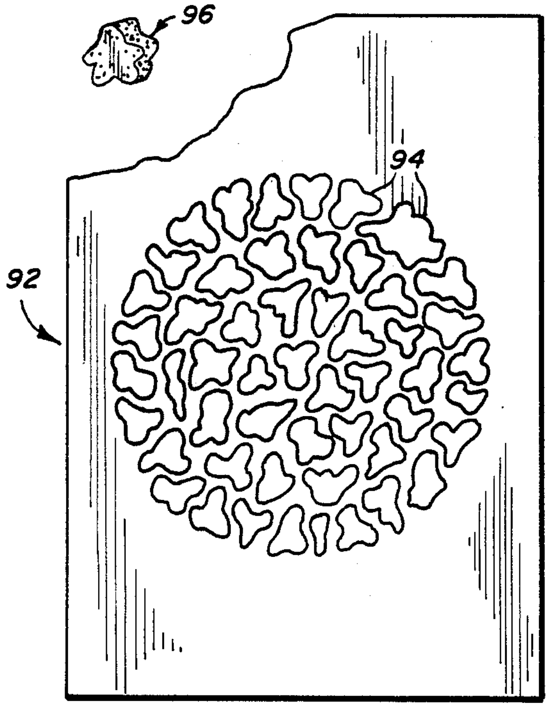
FIG. 10
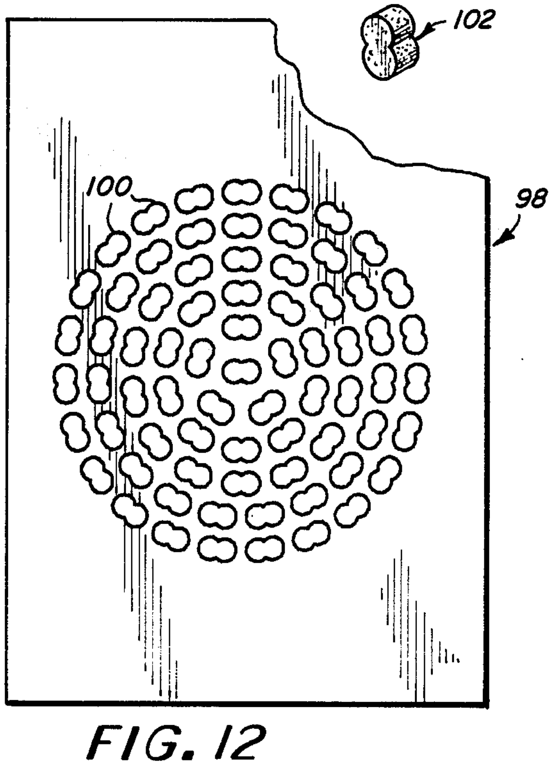
FIG. 12

METHOD FOR PROCESSING A COOKED FOOD PRODUCT

This is a divisional of co-pending application Ser. No. 763,034 filed on Aug. 6, 1985, now U.S. Pat. No. 4,731,006.

TECHNICAL FIELD OF THE INVENTION

The present invention relates to a method and apparatus for processing a cooked food product. More specifically, the invention relates to a method and apparatus for processing a cooked food product into a plurality of cooked food product portions having a predetermined weight.

BACKGROUND OF THE INVENTION

Several devices are known for processing food products. For example, see U.S. Pat. Nos. 4,260,640, to Hartmann et al.; 4,258,066 to Bernard; 4,124,339 to Bernard; and 4,081,564 to Borsuk. These prior art devices relate to extruding and forming food product portions from raw or frozen food mixtures. Such devices do not provide for extruding a cooked food product and cutting the cooked food product to a desired thickness. Further, these prior art devices do not provide for cutting a cooked food product on the other side of an extrusion plate. Such processes and devices typically require the use of high pressure extrusion apparatus in the case of the devices and processes relating to frozen food products, and additional steps as well as material handling problems in the case of devices and processes relating to raw food products. In both cases, such processes and devices have been found to be relatively slow and expensive.

With respect to food products, it has become desirable both in the home and in restaurants, as well as in various other settings to utilize food portioned in predetermined serving sizes which are readily usable in preparing specific food products. For example, it has become desirable to provide serving portions of meat, cheese and similar food product of a predetermined size and weight for topping pizza and similar food items. Further, it has become desirable to provide serving portions consisting of a plurality of discrete food products which may be placed in cooked form directly on the food item being prepared for further cooking. In addition, it is desirable for these food portions to have a particular appearance, that being a particular color, as well as a particular size, shape and thickness. Preferably, these characteristics should be those of a fresh food product having the appearance of being homemade. Specifically, it is desirable to have a precooked food item of random size and shape available which provides the appearance of a hand applied food product.

Consequently, a need has thus developed for a method and apparatus which processes a cooked food product to produce a plurality of cooked food product portions having a predetermined weight. The apparatus and process must not only be fast and cost effective, but must enable the formation of a plurality of different shapes and sizes of food products with very close weight tolerances which have the appearance of being hand formed.

SUMMARY OF THE INVENTION

The present invention has reduced or eliminated the problems associated with devices and processes heretofore known. In accordance with the present invention, a method and apparatus for processing a cooked food product into a plurality of cooked food product portions having a selected weight may be formed by positioning the cooked food product in an extrusion location and extruding the cooked food product through an extrusion plate. A plurality of elongated continuous lengths of cooked food product emerge from the extrusion plate which can then be divided into portions having a desired thickness. An apparatus is also provided for positioning the cooked food product into the extrusion location and extruding the cooked food product into a plurality of elongated continuous lengths of cooked food product. The apparatus also includes a dividing or cutting mechanism which severs the elongated continuous lengths of cooked product into portions of desired thickness on the opposite side of an extrusion plate. Hence, a plurality of cooked food product portions of a desired thickness, and consequently of a predetermined weight, are produced. The extrusion plate includes a plurality of randomly shaped apertures which extrude the cooked food product into a plurality of elongated continuous lengths of randomly shaped cooked food product. These randomly shaped elongated lengths are severed on the opposite side of the extrusion plate forming a plurality of randomly shaped food portions having a uniform thickness and an appearance of being hand formed.

The method and apparatus of the invention also include provisions for varying the rate of extrusion as well as the rate of division of the cooked food product portions, in a manner independent form one another. Adjustability of the rate of extrusion and division of the cooked food product in an independent manner provides selectability of the thickness and weight of the cooked food product portions.

It is, therefore, an object of the present invention to provide a method and apparatus for producing a cooked food product having a selected weight.

It is another object of the present invention to provide a method and apparatus for producing a plurality of cooked food products having a selected weight and thickness.

It is still a further object of the present invention to provide a method and apparatus that can mass-produce a plurality of cooked food products of uniform weight and thickness at low cost by simplified equipment.

It is still a further object of the invention to provide a method and apparatus for producing a plurality of cooked food product portions which allow for variable adjustment of the thickness, and consequently the weight, of the individual food product portions.

Moreover, the method and apparatus for processing the cooked food product into a plurality of cooked food product portions are economical, operate at improve manufacturing speeds and are capable of efficiently manufacturing a plurality of cooked food product portions which have the appearance of being hand formed.

These and other objects of the present invention, together with the advantages thereof, will become apparent to those skilled in the art from the detailed disclosure of the present invention as set forth below.

BRIEF DESCRIPTION OF THE DRAWINGS

FIG. 5 is a top elevational view of the apparatus of FIG. 1;

FIG. 6 is a side elevational view of the apparatus of FIG. 1 illustrating the apparatus mounted to a movable frame member;

FIG. 7 is a enlarged fragmentary perspective view of a portion of the apparatus of FIG. 1 illustrating a loaf of cooked food product being positioned into an extrusion position for processing;

FIG. 8 is a block diagram illustrating the overall continuous process of producing a plurality of cooked food product portions of the invention;

FIG. 9 is a perspective view of one type food product portion produced by the method and apparatus of the invention;

FIG. 10 is a fragmentary front elevational view of the extrusion plate used to produce the food product portion of FIG. 9;

FIG. 11 is a perspective view of a second type of food product portion produced by the method and apparatus of the invention; and FIG. 12 is a fragmentary front elevational view of the extrusion plate used to produce the food product portion of FIG. 11.

DETAILED DESCRIPTION OF THE INVENTION

Figure 4:
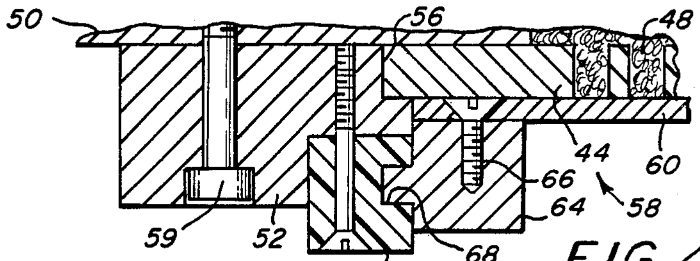
FIG. 4 is fragmentary cross-sectional view taken along line 4—4 of FIG. 2 illustrating the interchangability of the extrusion plate.

While this invention is susceptible of embodiment in many different forms, there are shown in the drawings and will herein be described in detail an illustrated embodiment of the invention. It should be understood, however, that the present disclosure is to be considered as an exemplification of the principles of the invention and is not intended to limit the invention to the embodiment illustrated.

Figure 1:
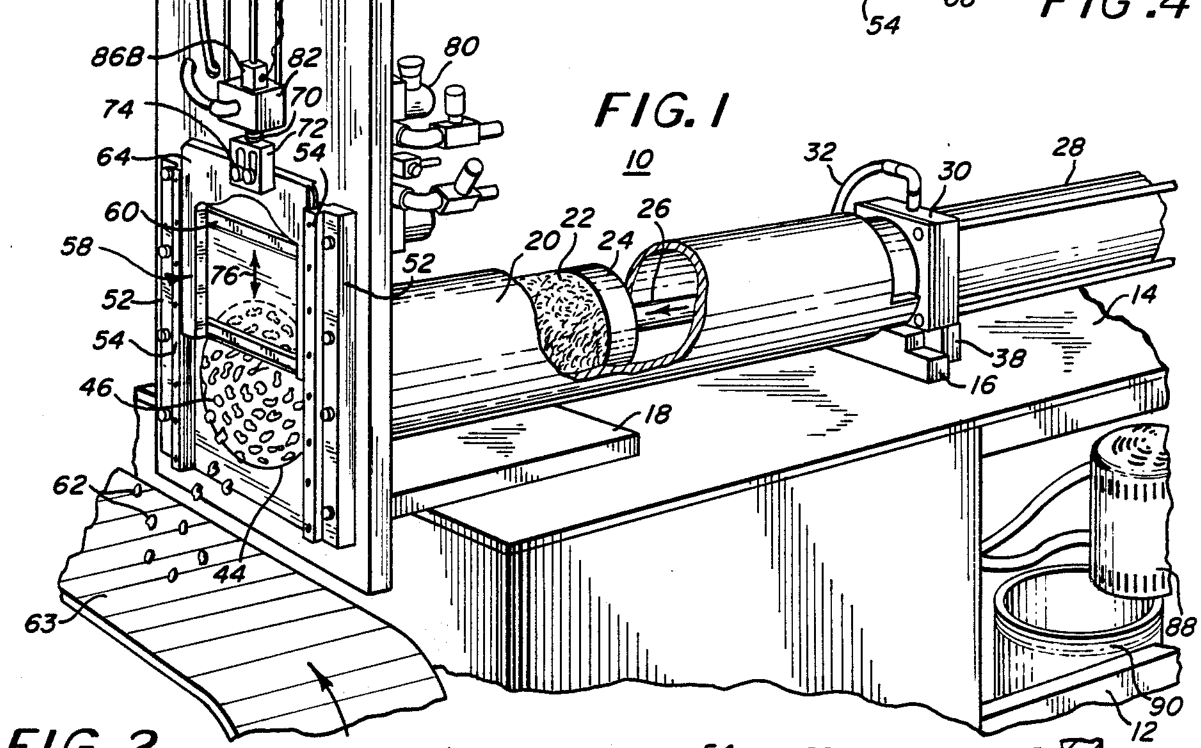
FIG. 1 is a perspective view of the apparatus for producing a plurality of cooked food product portions of the present invention.

Referring now to the drawings in detail, and first to FIGS. 1, 6 and 7, an apparatus or machine for processing a cooked food product is illustrated and generally designated 10. To facilitate use and mobility of the machine, frame 12 and associated mounting surface 14 are provided to which the machine 10 is mounted. Mounting of machine 10 to mounting surface 14 is provided through the use of mounting blocks 16 and a mounting bracket 18.

Machine 10 includes a food positioning mechanism which further includes an engaging member, an advancing member and a guide member. As illustrated, the guide member comprises a stainless steel tube 20 into which the cooked food product, preferably in loaf form such as food loaf 22, is placed. Food loaf 22 is advanced through force applied by the engaging member, preferably having a planar surface, such as plate 24. Plate 24 is advaced through tube 20 by an actuator, such as shaft 26. To facilitate advancement of shaft 26, and hence plate 24, a cylinder 28 is operatively associated with shaft 26 which provides movement on reciprocation of the shaft and plate 24 through tube 20 in the directions shown by the single double-headed arrow located on shaft 26. Cylinder 28 is operatively connected through the use of fittings 30 and associated tubing 32.

The loading of food loaf 22 is best depicted as illustrated in FIG. 7. Specifically, cylinder 28 including shaft 26 and plate 24 are pivotable through the use of bracket 34, pivot pin 36 and block 38. To facilitate such pivoting, guide tube 20 includes a cut-out portion 40 which allows plate 24 to be pivoted away from guide tube 20 when the plate and shaft 26 are withdrawn from the guide tube. Construction in this manner allows projecting portion 42, on guide tube 20 to be connected to mounting block 16 for mounting to mounting surface 14.

As illustrated in FIG. 5, machine 10 employs two bracket, pivot pin and block combinations to facilitate the pivoting of cylinder 28, shaft 26 and plate 24. Pivoting of the food loaf advancing mechanism is illustrated in phantom line in the right hand portion of FIG. 5.

Cooked food loaf 22 is advanced downline at a continuous rate through guide tube 20, by the variable force exerted by plate 24, toward an extrusion plate 44. Extrusion plate 44 includes a plurality of apertures 46 through which cooked food loaf 22 is forced. As food loaf 22 is extruded through apertures 46, a plurality of elongated continuous lengths of cooked food product 48 are formed.

Figure 2:
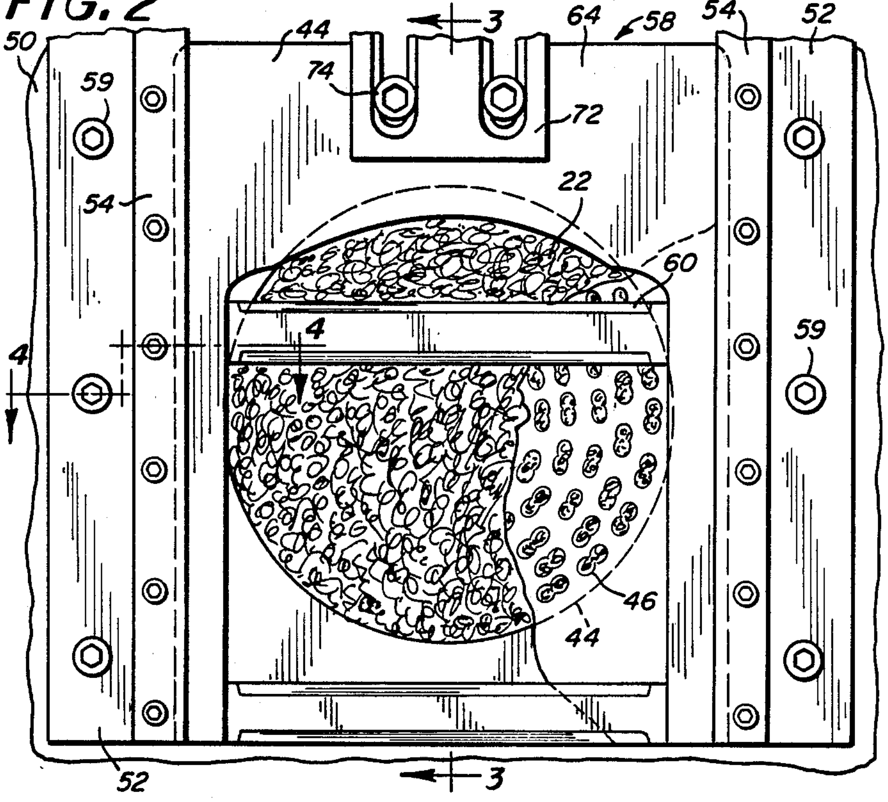
FIG. 2 is an enlarged fragmentary front elevational view of the cooked food product being extruded through an extrusion plate and divided into a plurality of cooked food product portions on the opposite side thereof.
Figure 3:
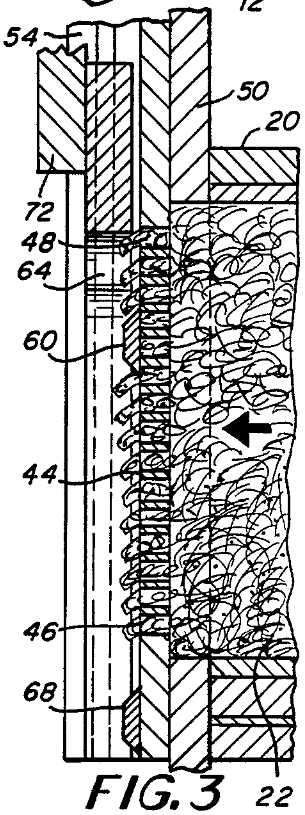
FIG. 3 is a cross-sectional view taken along line 3—3 of FIG. 2 illustrating the extrusion and division of the cooked food product.

FIGS. 1, 2 and 4 illustrate extrusion plate 44 mounted to a mounting plate 50 through the use of mounting bars 52 and guide members 54. As can be best seen in FIG. 4, extrusion plate 44 is held in position by an abutment 56 formed in mounting bars 52. A retaining force is maintained on extrusion plate 44 through the use of screws 59 which mount mounting bars 52 to plate 50.

As can be seen in FIGS. 1 and 6, a cutting mechanism 58 is positioned downline and in front of cooked food loaf 22 and extrusion plate 44. Cutting mechanism 58 includes a cutting blade 60 which is reciprocated in front of extrusion plate 44 to sever or cut and divide the elongated lengths of cooked food product into a desired thickness thereby forming a plurality of cooked food product portions 62. The cooked food product portions can then be transmitted for further processing by a conveying mechanism such as conveyor 63.

Cutting blade 60 is mounted to a blade mounting plate 64 through a fastener 66. Blade mounting plate 64 reciprocates in a channel 68 formed in guide members 54.

Reciprocation of blade 60 and associated blade mounting plate 64 is facilitated by an actuator 70. Actuator 70 is fastened to a connecting block 72 which is associated with blade mounting plate 64 through fastener 74. Vertical reciprocation of blade 60, blade mounting plate 64 and actuator 70, as indicated by the two double-headed arrows 76, is effected by a second cylinder 78.

As may be appreciated by one skilled in the art, a variety of cylinders may be provided to perform the cooked food loaf advancing function of cylinder 28, as well as the blade reciprocation function of cylinder 78. Such cylinders may include, but are not limited to, hydraulic cylinders, air cylinders or the like. Such cylinders may be selectively regulated through control of the fluid flow, fluid pressure or such similar operational parameter.

Cylinder 78 is connected to a regulating mechanism, such as control valve 80, to provide adjustment of the rate of reciprocation of blade 60 and hence the rate of division of the cooked food product lengths. Such connection is made through fittings 82 and tubing 84. As noted above, adjustment of the rate of reciprocation of blade 60 may be obtained by regulation of the fluid flow or the fluid pressure delivered to cylinder 78.

A sensing mechanism, such as limit switches 86A and 86B, is included to sense and provide a signal indicating the outer positions of travel of actuator 70. The direction of motion of actuator 70 is controlled in relation to the signal supplied by limit switches 86A and 86B. For example when actuator 70 is at the top of its stroke a signal is supplied by limit switch 86A to reverse the direction of travel of the actuator. When actuator 70 reaches the bottom of its stroke, the signal supplied supplied by limit switch 86B again reverses the direction of travel of the actuator. The positioning of limit switches 86A and 86B on cylinder 78 provides selective adjustment of the stroke length of actuator 70 and associated blade 60. It should be understood that such limit switches may sense magnetically, electronically, ultrasonically or in a similar manner.

The combination of selective adjustibility of the rate of reciprocation of blade 60, stroke length of actuator 70, as well as selective adjustability of the rate of extrusion of food loaf 22, each independent of one another, provides a full spectrum of adjustment in the thickness, and consequently the weight, of cooked food portions 62. For example, as the stroke length of actuator 70 is lengthened, the rate of reciprocation of actuator 70 reduced, or the rate of extrusion of food loaf 22 increased, the thicker and heavier the cooked food product portions 62. Alternatively, the shorter the stroke length of actuator 70, the higher the rate of reciprocation of actuator 70 or the slower the rate of extrusion of food loaf 22, the thinner and lighter the cooked food portions 62.

As noted above, a wide variety of different types of cylinders may be utilized to actuate the apparatus of the invention. A pump, such as hydraulic pump 88 and a reservoir such as tank 90, are necessary to house and recirculate the fluid which actuates machine 10. Such a fluid may include oil, air or similar incompressible fluids.

It may be appreciated by those skilled in the art that a variety of interchangeable extrusion plates 44 may be utilized to vary the appearance of cooked food product portions 62. One such extrusion plate is illustrated in FIG. 10 and generally designated 92. This type of plate includes a plurality of randomly shaped apertures 94 which produce a food product portion generally designated 96 in FIG. 9. This type of extrusion plate is desirable if the food product portion is to take on hand formed appearance.

A second embodiment of the extrusion plate is illustrated in FIG. 12, generally designated 98, having a plurality of uniform apertures 100. This type of extrusion plate having uniform apertures 100 produces a food product portion 102, illustrated in FIG. 11, which is more uniform in shape than the food product portion 96 produced by extrusion plate 92. It may be appreciated by those skilled in the art that a variety of extrusion plates having a variety of aperture shapes may be provided for use with the method and apparatus of this invention.

As can be seen in FIG. 8, the overall method for producing a plurality of cooked food product portions is illustrated in a step-by-step manner. More specifically, an emulsion is first formed from a combination of ingredients including, but not limited to, a food product, such as meat, cheese or the like, seasonings and flavorings (preferably including salt) and a liquid (preferably water) as illustrated in step 104. The emulsion is put into a mold in step 106 and subsequently heated, for cooking purposes, and cooled in step 108. The mold may include, but is not limited to, a metal, plastic or similar forming member. Preferably, the mold consists of a natural food product casing which is commonly formed from animal intestines or similar casing material. It should be understood that a variety of casing diameters and lengths can be used. Such lengths and diameters include, but are not limited to, the ranges of 20 to 40 inches in length and 8 to 12 inches in diameter. The food product emulsion is heated in the mold or casing to a cooking temperature in the operable range of 137° to 160° Fahrenheit for a period of approximately from about (4) to about six (6) hours. Preferably, the emulsion formed into a natural casing is placed in a cooking room or smoke house at a temperature of 140° to 150° Fahrenheit for the time period of from about four (4) to about six (6) hours thereby completing the cooking step.

Cooling of the cooked food product also takes place while the food product is in the mold or casing. Preferably, the cooked food product loaf is cooled in a cooling area to a temperature within the range of 35° to 40° Fahrenheit within a time period of from about four (4) to about six (6) hours. Cooling preferably takes place in a cooling area such as a refrigerator or a refrigerated room, and preferably within the same room cooking takes place, having a temperature variable in the range of 30° to 40° Fahrenheit. Within about a six (6) hour period, the cooked food loaf product is cooled to a temperature in the range of 35° to 40° Fahrenheit. Preferably in about four (4) to about six (6) hours, the product is cooled to about 40° Fahrenheit in a cooling area having a temperature in the range of about 30° to about 40° Fahrenheit.

After the emulsion has been cooked, set, cooled and a cooked food product loaf has been formed in the shape of the mold, the loaf is then removed from the mold in step 110. The cooked and cooled food product loaf is then positioned into an extrusion location on the extrusion apparatus of the present invention in step 112, and extruded in step 114 through the application and maintenance of a selectively variable force, as indicated by arrow 116. The force applied to the cooked food product loaf is variable in the range of about 1,500 to about 13,000 pounds to provide selective adjustment of the rate that the food product is fed through the extrusion apparatus. Forces outside this operation range typically do not allow of a commercially acceptable food product to be produced and do not provide desirable operation of the extrusion apparatus. Preferably, a force in the range of about 10,000 to about 13,000 is utilized to take advantage of the efficiencies and economies associated with the present invention.

In addition, considering the disclosed preferred embodiment of the present invention, force on the food product is selected and maintained such that a volume of cooked food product, also selectively variable in conjunction with the force, in the range of about 1100 pounds per hour to about 2100 pounds per hour may be extruded. Preferably, a volume of 1500 pounds per hour of cooked food product is extruded. With respect to the disclosed preferred embodiment, a rate slower than 1100 pounds per hour may not fully utilize all of the machine's capabilities, in particular, its cost saving and profitability features. A production rate greater than 2100 pounds per hour produces a cooked food product that may not be commercially acceptable, and which may cause equipment and operation difficulties. It should be understood that the above cited operational parameters are illustrative in nature, and an apparatus having various combinations of operational parameters is contemplated by the present invention.

As force is applied to the food product loaf, the loaf is continuously moved toward the extrusion plate and subsequently extruded therethrough to form a plurality of elongated continuous lengths of cooked food product. The force may be selectively varied to adjust the rate of extrusion as more specifically described above. Immediately on the other side of the extrusion plate, the elongated cooked food product lengths are cut to a desired thickness forming a plurality of cooked food product portions having a unique hand formed appearance. These food product portions are subsequently refrigerated to a desired temperature, which may include freezing, in step 120. Preferably, the cooked food product portions are frozen in a freezing chamber. The freezing chamber cools the food portions to a temperature in the range of about (+15°) to about (−10°) Fahrenheit in approximately about five (5) to about ten (10) minutes after the cooked food product portions enter the freezing chamber.

More specifically, the elongated lengths of the cooked food product are cut through the use of a reciprocating blade positioned on the opposite side of the extrusion plate from the cooked food product loaf, as previously herein described. The rate of reciprocation of the blade, in conjunction with the rate of extrusion, as previously described herein, determines the thickness of the cooked food product portions. Further, the reciprocating action of the blade, in conjunction with the extrusion force maintained on the food product loaf, provides a cutting action which gives the food product portions a hand formed appearance. To obtain the desired thickness a blade reciprocation rate in the range of about fifty (50) to about two hundred twenty five (225) strokes per minute is desired in conjunction with the extrusion rate previously recited of about 1100 to about 2100 pounds per hour. This combination of ranges for blade reciprocation and extrusion rate provides a commercially acceptable product which is used as a food product topping, among other potential uses. Specifically, an extrusion rate of about 1500 pounds per hour and a blade reciprocation rate of about one hundred twenty five (125) cycles per minute is one desirable combination which produces satisfactory food product portions of the desired range of thicknesses for use as a food product topping. It may be appreciated by those skilled in the art that a variety of combinations are possible, while still producing a commercially acceptable food product.

The cooked food product portions may be cut into a variety of thicknesses ultimately depending on the desired use of the cooked food product portions. Preferably, the thickness of the cooked food product portions is generally in the range of ¼" (inch) to 1¼" (inches), with the desired thickness falling in the range of ½" (inch) to ¾" (inch). While thicknesses above 1¼" (inches) are usable, such thicknesses produce a food product portion which is heavier and therefore not as desirable for particular commercial uses, namely as a food product topping. Again, it may be appreciated that at step 118, depending on the type of extrusion plate used, the cooked food product portions may take on a variety of shapes, including, but not limited to, random shapes including, but not limited to, the shape illustrated in FIG. 9, a clover shape, a figure eight shape, a circular shape and similar random shapes, uniform shapes including, but not limited to, the shape illustrated in FIG. 11, and the like.

While the apparatus and method of the present invention has been described generally with respect to preparing food products and portions thereof, it will be understood by those skilled in the art that the present apparatus and method may be utilized to produce a wide variety of products when it is desirable to form a plurality of discrete product portions having a uniform weight, size, shape and similar characteristics, as well as being formed from a prepared or cooked mass of product or material. It should also be understood that, among other uses, the discrete food product portions may be used as a food product topping which has the appearance of being hand formed and hand applied, while providing a substantial cost savings and operating efficiency. In addition, it should be understood that in relation to preparation of food products, such food products may include, but are not limited to, meat products such as sausage and the like, milk products such as cheese, dough and the like, and other similar food products. Further, while certain ranges of operational parameters have been disclosed herein for illustrative purposes, it should be understood that a variety of such parameters are contemplated by this disclosure, including, but not limited to, a variety of combinations of such parameters.

Thus, a unique, cost effective, time saving method and apparatus for processing a cooked food product is provided which is adapted for use in processing a plurality of cooked food product portions. Further, the method and apparatus of the invention provides for formation of a cooked food product portions having a variety of shapes, including, but not limited to, randomly shaped portions, uniformly shaped portions and the like, and which may take on a hand formed appearance. In addition, the method and apparatus of the invention provides variable adjustment of a variety of operational parameters to vary the thickness and weight of the individual cooked food product portions.

From the foregoing, it will be appreciated that numerous variations and modifications may be effected without departing from the true spirit and scope of the novel concept of the subject invention. It is to be understood that no limitation with respect to the specific apparatus illustrated herein is intended or should be inferred. It is, of course, intended to cover all such modifications as fall within the scope of the appended claims.

What is claimed is:

1. A method for forming, cooking and processing a meat or poultry containing food product comprising the steps of:

reducing the size of the food product by grinding, chopping, milling or comminuting said product to create a formable mass;

forming a defined product loaf from said formable mass;

cooking said product loaf through the application of heat;

positioning the cooked product loaf in an extrusion location on one side of an extrusion plate;

compressing at least a portion of said cooked product loaf to thereby extrude the cooked product loaf through said extrusion plate to form a plurality of irregularly shaped continuous lengths of cooked product; and dividing said lengths of cooked product into a plurality of cooked product portions which have a hand-formed,randomly shaped irregular appearance and have a predetermined weight.

2. The method of claim 1 wherein the step of dividing said lengths of cooked product takes place on the distal side of said extrusion plate.

3. The method of claim 1 further comprising the step of maintaining sufficient force on said cooked product loaf such that said cooked product loaf is extruded through said extrusion plate at a substantially continuous rate.

4. The method of claim 3 further comprising the step of varying the force maintained on said cooked product loaf thereby varying the rate of extrusion to vary the thickness of said cooked food product portions.

5. The method of claim 1 further comprising the step of varying the rate of division of said lengths of cooked product to vary the thickness of said cooked product portions.

6. The method of claim 1 further comparing the step of refrigerating said cooked food product portions to a desired temperature.

7. A method for producing a plurality of pre-cooked meat product portions comprising the steps of:

forming a meat-containing emulsion from a meat product placing said emulsion into a container having a defined shape;

cooking said emulsion in the container to thereby produce a cooked product loaf;

positioning said cooked product loaf in an extrusion location on one side of an extrusion plate;

maintaining force on said cooked product loaf such that said cooked product loaf is compressed and moved toward said extrusion plate;

extruding said cooked product loaf through said extrusion plate forming a plurality of elongated irregularly shaped continuous lengths of cooked product; and continuously cutting said elongated continuous lengths of cooked product on a second side of said extrusion plate thereby producing a plurality of randomly shaped irregular cooked product portions which have a predetermined weight.

8. The method of claim 7 including the step of varying the amount of force maintained on said cooked food product loaf to vary the rate of extrusion and to vary the weight of said cooked food product portions.

9. The method of claim 7 including the step of varying the rate of cutting said elongated continuous lengths of cooked food product to vary weight of said cooked food product portions.

10. The method of claim 7 including the step of refrigerating said plurality of said cooked food product portions to a desired temperature.

11. A method for making a precooked meat or poultry product comprising the steps of:

preparing an emulsion containing at least meat or poultry;

forming the emulsion into a predetermined shape having a predetermined cross-section;

cooking the formed emulsion for a time and at a temperature sufficient to form a precooked food product;

extruding the formed, cooked emulsion of predetermined shape by compressing at least a portion of the formed, cooked emulsion and forcing it through a plurality of restrictive areas to form a plurality of irregularly shaped continuous lengths of cooked emulsion; and cutting said lengths of cooked emulsion during extrusion to form randomly shaped irregular pieces of finished product having a cross-section less than the cross-section of the formed emulsion and having a predetermined weight.

12. The method of claim 11, wherein the step of forming said emulsion includes molding said emulsion into a substantially cylindrical shape having a diameter between about four (4) to twenty (20) times the maximum cross-sectional dimension of the finished randomly shaped irregular pieces.

13. The method of claim 12 wherein the step of forming said emulsion includes molding said food emulsion into a substantially cylindrical shape having a diameter about twelve (12) times the maximum cross-sectional dimension of the finished randomly shaped irregular pieces.

14. The method of claim 11 including the step of cooling said formed, cooked food emulsion after cooking for a time and at a temperature sufficient to provide adequate binding and consistency to make the emulsion readily extrudable and severable.

15. The method of claim 14 wherein the step of cooling said formed, cooked emulsion includes cooling said emulsion to a temperature of about 30° F. to about 40° F.

16. The method of claim 11 including the step of freezing said randomly shaped irregular pieces of finished product.

17. The method of claim 11 wherein the step of cooking the formed emulsion includes cooking said formed emulsion for a time and at a temperature sufficient to coagulate protein in said formed emulsion.

18. The method of claim 17 wherein the step of cooking said formed emulsion includes cooking said formed food emulsion at a temperature of between about 137° F. and about 160° F. for a time of about four (4) to about fourteen (14) hours.

19. The method of claim 11 wherein the step of preparing an emulsion includes preparing an emulsion from unprocessed meat or poultry and spices, water and flavoring.

20. A method for making a precooked sausage product suitable for use as a pizza topping comprising the steps of:

preparing an emulsion containing at least meat or poultry;

mixing a seasoning into said emulsion;

stuffing said emulsion into a sausage casing at a pressure sufficient to fill said casing and form a loaf of predetermined shape;

applying heat to the loaf for a time and at a temperature sufficient to cook it;

cooling the cooked loaf;

removing the sausage casing from the cooked loaf;

forcing the cooked loaf by application of compressive forces through a plurality of restrictive orifices to form lengths of irregularly shaped precooked sausage product; and simultaneously cutting said lengths of extruded precooked sausage product to form a plurality of randomly shaped irregular precooked sausage portions which have a predetermined weight.

21. The method of claim 20 wherein said orifices are formed in an extrusion plate and said cutting is carried out by a blade that simultaneously cuts said extruded lengths of precooked sausage product.

22. The method of claim 21 wherein the cooked loaf is cooled to temperatures of about 30° F. to 40° F. before being forcing through the plurality of restrictive orifices.

23. The method of claim 21 wherein the loaf of predetermined shape is cooked at a temperature of between about 137° F. and about 160° F. for a time of about four (4) to about fourteen (14) hours.

24. The method of claim 21 wherein substantial compressive forces are applied to the cooked loaf and the plurality of restrictive orifices have an irregular shape.

25. A method of for making a precooked sausage product suitable for use as a pizza topping comprising the steps of:

preparing an emulsion containing at least meat or poultry;

mixing a seasoning into said emulsion;

forming the emulsion into a loaf of predetermined shape;

applying sufficient heat to the loaf to cook it;

allowing the cooked loaf to cool;

compressing the cooked and cooled loaf through a plurality of restrictive orifices formed in an extrusion plate to create a plurality of separate lengths of irregularly shaped precooked sausage product; and simultaneously cutting said legnths with a blade that continuously cuts said extruded lengths of precooked sausage product to form a plurality of separate randomly shaped irregular precooked sausage portions which have a predetermined weight.

* * * * *